United States Patent [19]

Packer

[11] 4,408,635
[45] Oct. 11, 1983

[54] HYDROPNEUMATIC PULSE INTERCEPTOR

[75] Inventor: Martin R. Packer, Rocky Mount, N.C.

[73] Assignee: Liquid Dynamics, Inc., Rocky Mount, N.C.

[21] Appl. No.: 317,185

[22] Filed: Nov. 2, 1981

Related U.S. Application Data

[63] Continuation of Ser. No. 121,517, Feb. 14, 1980, abandoned, which is a continuation-in-part of Ser. No. 100,697, Dec. 5, 1979, abandoned.

[51] Int. Cl.³ ............................................. F16L 55/00
[52] U.S. Cl. .................................................... 138/30
[58] Field of Search ...................... 138/26, 30; 92/90; 220/85 B

[56] References Cited

U.S. PATENT DOCUMENTS

| | | | |
|---|---|---|---|
| 2,918,090 | 12/1959 | Shelly | 138/30 |
| 3,333,600 | 8/1967 | Mercier | 138/30 X |
| 3,442,293 | 5/1969 | Erdmann | 138/30 |
| 3,537,357 | 11/1970 | Packer et al. | 138/30 X |
| 3,853,147 | 12/1974 | Cibulka | 138/30 |
| 3,868,972 | 3/1975 | Zirps | 138/30 |
| 4,166,478 | 9/1979 | Sugimura | 138/30 |
| 4,205,637 | 6/1980 | Ito et al. | 138/30 X |

FOREIGN PATENT DOCUMENTS 2417193 11/1975 Fed. Rep. of Germany ........ 138/30

Primary Examiner—James E. Bryant, III
Attorney, Agent, or Firm—B. B. Olive

[57] ABSTRACT

The invention relates to a hydropneumatic accumulator in which a bladder or membrane supported within a vessel establishes a chamber for confining a compressible fluid within the vessel and also provides means for supporting a valve plate opposite inlet and outlet ports arranged so that as the valve plate position responds to pressure changes normal flow between the ports may be maintained and extruding of the bladder or diaphragm into the outlet port prevented.

4 Claims, 16 Drawing Figures

HYDROPNEUMATIC PULSE INTERCEPTOR

CROSS-REFERENCE TO RELATED APPLICATION

This application is a continuation, of application Ser. No. 121,517, filed Feb. 14, 1980, now abandoned which was a CIP of Ser. No. 100,697, filed Dec. 15, 1979, now abandoned.

BACKGROUND OF THE INVENTION

1. Field of the Invention

The invention relates to hydropneumatic apparatus as used for pump pulsation damping, pipeline shock absorption, pipeline fluid thermal expansion compensation, and the like. While referred to as a hydropneumatic pulse interceptor such an apparatus is also referred to as a hydropneumatic accumulator.

2. Description of the Prior Art

It is desirable to prevent cavitation from occurring within positive displacement pumping chambers. Cavitation occurs on the suction stroke of positive displacement pumps because of the need to generate energy to accelerate the flow of liquid into the pumping chamber. The energy necessary to accelerate this flow may be considerable in the situation involving a long length of suction line and consequently a substantial volume of liquid. The ambient pressure applied to the liquid may not be sufficient to cause the acceleration of the suction flow. In these circumstances, the suction stroke of the pump causes the vapor of the liquid to come out of solution and hence for at least a portion of the suction stroke, the pumping chamber is not being filled. As a result of these circumstances, part of the pump delivery stroke is merely dissipated and results in forcing the vapor back into solution. The pump plunger then effectively encounters a solid wall of liquid which causes an abrupt shock or pulse to be emitted from the discharge port of the pump.

It is known that when the circumstances mentioned above are prevented, the horsepower required to drive the pump can be reduced and the pump discharge flow can be sinusoidal rather than square wave in character. Various types of hydropneumatic accumulators are known in the prior art. Applicant's prior U.S. Pat. No. 3,537,357, for example, teaches a hydropneumatic accumulator having a cylinder divided by a sliding piston which mounts a flexible diaphragm which separates the compressible fluid from the incompressible fluid in the cylinder. The entry and exhaust ports are located at one end of the cylinder and on either side of the longitudinal center line of the accumulator. The compressible fluid gains contact with the diaphragm by passing through the center of a conical end portion of the piston. While the hydropneumatic accumulator described in patent 3,537,357 has found useful application in the industry, it has been noted that the conical end of the piston tends to deflect the pulses to some extent and this action prevents maximum cooperation of the incompressible fluid with the diaphragm. Furthermore, the arrangement described in U.S. Pat. No. 3,537,357 is not suitable for use with liquids containing solid particles. Nevertheless, the arrangement described in U.S. Pat. No. 3,537,357 does prevent the mentioned diaphragm from extruding into the outlet port which is a desirable characteristic for any accumulator utilizing a diaphragm.

U.S. Pat. No. 3,483,893 teaches another type of hydropneumatic accumulator having a single port which operates as both an inlet port and an outlet port for admitting and discharging the incompressible fluid being operated on by the accumulator. This single port within the accumulator connects through multiple passages to the interior of a flexible bag which is adapted to receive the incompressible fluid and is surrounded by a chamber filled with compressible fluid. The construction associated with U.S. Pat. No. 3,483,893 introduces substantial costs because of having to make multiple entries for admitting the incompressible fluid to the bag and because of requiring an anti-extrusion valve plate for each of the seats associated with the several passages that admit and discharge the incompressible fluid to and from the bag so as to prevent any portion of the bag being extruded through any of such multiple entries and passages. Also, the construction described in U.S. Pat. No. 3,483,893 involves providing a bag of relatively complex cross section in order to effect an arcuate swinging of the mentioned anti-extrusion valve plates toward and away from the seats associated with the multiple entries and passages.

U.S. Pat. No. 4,166,478 teaches both single port and twin port-type hydropneumatic accumulators. The accumulator construction employed in U.S. Pat. No. 4,166,478, like the construction as employed in U.S. Pat. 3,483,893, employs a bladder into which the incompressible fluid is admitted and from which such incompressible fluid is discharged as the line pressure conditions change. A perforated rigid shell member projects upwardly into the bottom of the bladder to prevent extrusion of the bladder into the port when the incompressible liquid is being discharged.

Another type of hydropneumatic accumulator has been sold by the assignee of the present application FLOWCHEM, Inc., 1000 Instrument Drive, Rocky Mount, N.C. 27801 under the trademark Hydroflex. One version of the Hydroflex accumulator comprises a cylinder one end of which is closed by a closely fitting plug which also supports a bag within the cylinder. The opposite end of the cylinder is fitted with a single port through which the incompressible fluid is admitted and discharged into a chamber surrounding the bag with the bag being filled with a compressible fluid. The accumulator bag mounts at its closed end opposite the single port a so-called button valve having a circular plate member of larger diameter than the port and which acts to prevent extrusion of the bag into the port when the incompressible fluid is being discharged through the port from the cylinder. This version of the Hydroflex accumulator however does not provide either flow through the accumulator nor does it allow flow into the accumulator when the button valve is sealing the mentioned single port.

Within the last few weeks, prior to this application, there has appeared another type of hydropneumatic accumulator sold by FLOWCHEM, Inc., and sold under the trademark Jumboflex. The Jumboflex accumulator, like the Hydroflex accumulator described above, has a cylinder with one end closed by a close fitting plug that supports a bag containing a compressible fluid. The opposite end of the cylinder is provided with a single port for admitting and discharging the incompressible fluid being operated on by the accumulator. The Jumboflex accumulator also incorporates an antiextrusion button valve which operates in the manner described for the Hydroflex accumulator. Increased tension on the bag when in its most extended position is provided by a suspension strap mounted within the bag and extending between the mentioned cylinder closure plug and a fitting within the bag and forming part of the button valve. The use of this suspension strap assists in preventing the button valve from prematurely covering the single port before the incompressible fluid has been discharged.

With the foregoing in mind, the object of the hydropneumatic accumulator of the invention has the severalfold purpose of providing an accumulator having extreme pressure sensitivity, providing an accumulator having a flow-through path enabling the extreme pressure sensitivity of the accumulator to act upon the flow, to provide an accumulator which does not intercept and shut off the flow when in a non-operational mode, to provide an accumulator having both inlet and outlet ports communicating with a portion of the cylinder adapted to receive and discharge the incompressible fluid and arranged so that the outlet port can be completely sealed without closing the inlet port, to provide an accumulator that can be manufactured from readily available materials compatible with the range of different liquids normally encountered in the application of accumulators and to provide an accumulator in which the bag or membrane member employed to contain the compressible fluid is adapted to be moldable from readily available elastomers and in a form of relatively simple cross section.

SUMMARY OF THE INVENTION

The invention is illustrated in two embodiments. One embodiment uses a membrane in the nature of a flexible diaphragm as a means of separating the compressible fluid from the incompressible fluid. Another embodiment provides a bag-shaped membrane for the same purpose. Both embodiments are characterized by having the inlet and outlet ports located so that an anti-extrusion valve can move to cover both ports to prevent extrusion of the bag or diaphragm but without interrupting the flow between the ports. Both embodiments are further characterized by the fact that in all positions of the diaphragm or bag membrane, the incompressible fluid being operated on flows through the device of the invention. In one embodiment, the incoming incompressible fluid being operated on effectively sees and comes into contact primarily only with the surface of a flexible diaphragm thereby providing extreme sensitivity and minimizing the overall cost by reducing the need for special materials to compensate for corrosion effects and the like.

In the specific embodiments illustrated, the inlet and outlet ports are formed by having the outlet port in the nature of a flared tube surrounded by an annular inlet port. Among other advantages, this port arrangement establishes a vortex-type action within the device of the invention as the liquid flows therethrough which enables the device of the invention to serve as a mixing device in addition to serving the normal function of a hydropneumatic accumulator such as fluid dampening, fluid shock absorbing or fluid temperature compensation. In the diaphragm version of the invention, a plurality of elastic straps are employed to support the diaphragm and which allows the diaphragm to be attached to the accumulator vessel near the exhaust port. In the other version of the invention, the bag is supported at a position more remote from the exhaust port by means of a tight fitting plug. FIGS. 3–9 show various aspects of the bag form and FIGS. 10–16 the diaphragm form of the invention in various constructions.

DESCRIPTION OF THE PREFERRED EMBODIMENT

Figure 1:
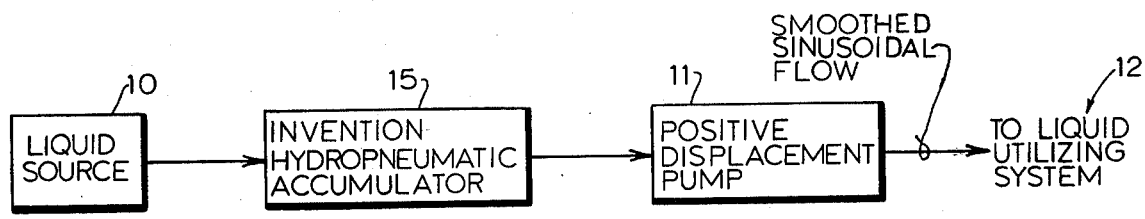
FIG. 1 is a schematic diagram illustrating a typical application of the hydropneumatic accumulator of the invention.
Figure 2:
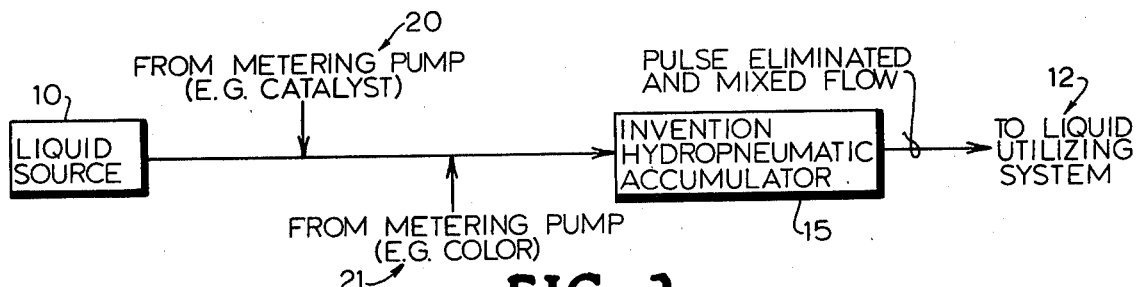
FIG. 2 is another schematic diagram illustrating how the hydropneumatic accumulator of the invention may be used as a mixing device.

FIGS. 1 and 2 illustrate schematically how the hydropneumatic accumulator of the invention may be employed. FIG. 1 illustrates the more general application in which a substantially incompressible fluid comprising a fluid source 10 which may be at or above atmospheric pressure is to be pumped by a positive displacement pump 11 to a system 12 utilizing the fluid in some intended manner. In this application, the hydropneumatic accumulator of the invention, generally designated 15, is installed between the source 10 and the pump 11 to provide a smoothed sinusoidal flow as the output of pump 11 as represented in FIG. 1. The exact manner in which and how this result is obtained will be brought out in later description.

Another and unique application of the hydropneumatic accumulator of the invention is schematically illustrated in FIG. 2. In this application, the fluid from the liquid source 10 in FIG. 2 is assumed to be combined with another fluid source from a metering pump 20 introducing, for example, a fluid catalyst. Further downstream, it is also assumed that an additional fluid is to be combined with the fluids from liquid source 10 and metering pump 20 as illustrated by a metering pump 21 introducing, for example, a color in fluid form. The three sources of fluids are then illustrated in FIG. 2 as providing a combined fluid flow which is introduced to the hydropneumatic accumulator 15 of the invention. In this application, the accumulator invention serves both the purpose of mixing the three fluids and also for eliminating the fluid pulse before going on to the liquid utilizing system 12. Later description will deal with how both the mixing as well as the normal hydropneumatic functions are achieved.

The invention is illustrated in one embodiment in FIGS. 3–9 and in another embodiment in FIGS. 10–16 with certain parts of the two embodiments being interchangeable as later described.

Referring first to FIGS. 3–9, the first embodiment described is generally indicated as hydropneumatic accumulator 30 and comprises a cylindrical vessel 31 having one end closed by a close fitting header plug 32. Plug 32 is arranged to support internally of vessel 31 a cup-shaped bag 35 filled with a compressible fluid, e.g, a suitable gas, and which is normally held at approximately 70% of the line pressure in which the hydropneumatic accumulator 30 of the invention is to be employed. Bag 35 is formed with an appropriate internal bead 40 fitted in an external annular bead groove 41 formed in header plug 32. An anchorage rib 45 is fitted in an anchorage groove 46 in plug 32. An O-ring 50 fits in groove 51 formed in plug 32 and a segmental lock ring 55 is made up of three segments fitted in a groove 56 formed in the internal wall of vessel 31 and arranged to seat on a recess 57 formed on plug 32. An additional O-ring 60 acts as a weather seal. A stop cock valve 65 connects through a port 66 to allow release of the fluid, e.g., gas, contained within bag 35 and a one-way valve 67 connects through port 68 to allow introduction of the gas or other compressible fluid into bag 35 through the passage provided by port 68.

Accumulator 30 ties into the pipeline, not shown, by means of an upstream flange connector 70 and associated pipe 71. A downstream flange connector 72 and associated pipe 73 provides a downstream pipeline connection. The incoming fluid brought in by pipe 71 enters vessel 31 through an annular inlet port 80 surrounding a somewhat trumpet shaped and flared pipe end 81. This arrangement provides an outlet port 82 within and concentric to the inlet port 80. All fluid operated on by accumulator 30 is forced into a flow-through path. That is, all of the fluid is directed into inlet port 80 and out the outlet port 82. Other advantages of this port configuration will also be pointed out as the description proceeds.

Figure 9:
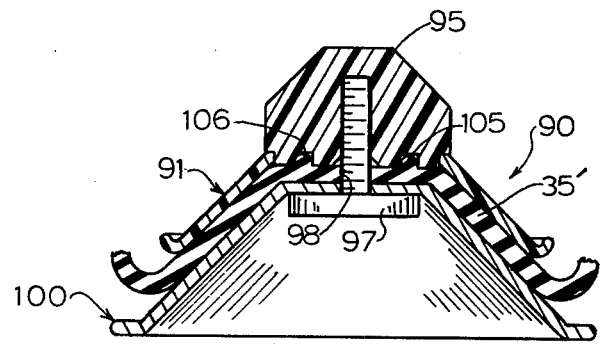
FIG. 9 is an enlarged cross-sectional view of the extrusion valve assembly of FIG. 3 with a partial sectional view of a portion of the bag on which the valve assembly is supported.

An anti-extrusion plate assembly, generally designated 90, is supported on the lower end of bag 35. Assembly 90 comprises an upper somewhat conical-shaped plate member 91 having a hole 92, slight upturned edges 93 and a smooth internal surface 94. A captive nut 95 fits in hole 92 and thereby seats on plate member 91 as seen in FIG. 9. Nut 95 has a threaded recess 96 which receives a bolt 97 which in turn passes through a hole 98 formed in the bottom end of bag 35. A lower somewhat conical-shaped plate member 100 is secured below the bottom end of bag 35 and is provided with a hole 101 for receiving bolt 97 to clamp the lower portion 35' of bag 35 between plates 91 and 100. An annular rib 105 on the upper internal surface of bag portion 35' fits within a mating groove 106 to effect a fluid-tight seal when bolt 97 is tightened into nut 95 by forcing rib 105 into groove 106 on nut 95.

Prior to describing the operation of the first embodiment illustrated in FIGS. 3–9, the construction employed in a second embodiment illustrated in FIGS. 10–11 will be described from which certain common constructional and operating characteristics will be better understood. The description of FIGS. 12–16 will follow.

Figure 10:
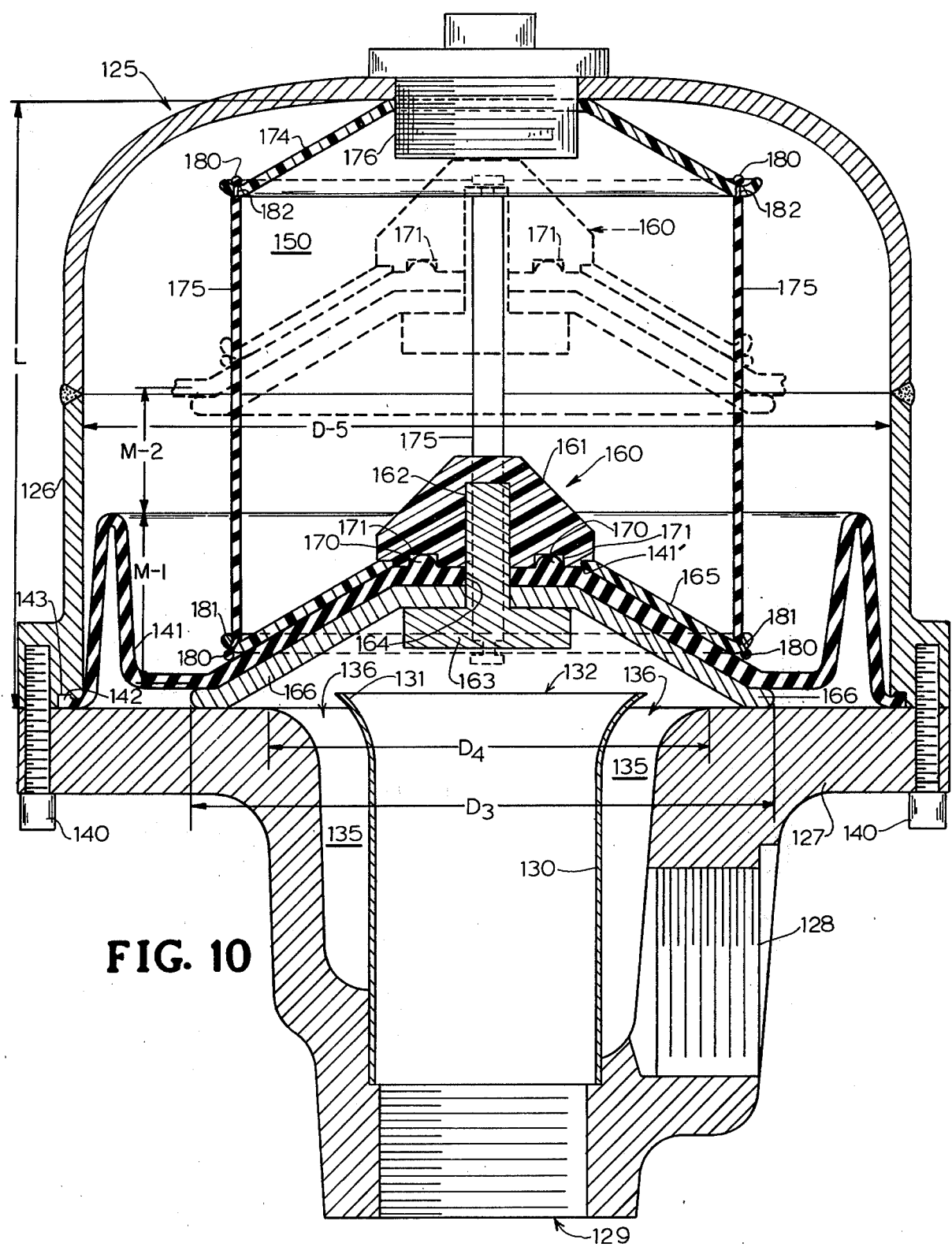
FIG. 10 illustrates a second embodiment utilizing a diaphragm-type membrane with auxiliary elastic support straps with the anti-extrusion valve and diaphragm being shown in solid lines in the lowest position and in dotted lines in the highest position.
Figure 11:
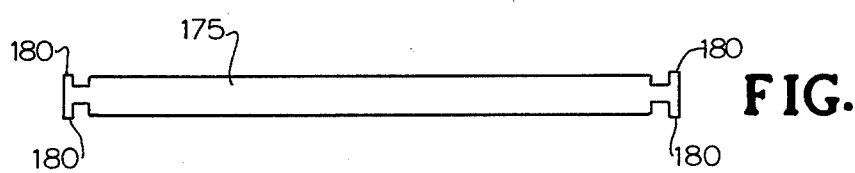
FIG. 11 is a side view of one of the molded elastic straps employed in the invention accumulator illustrated in FIG. 10.

Referring first to FIG. 10, the second embodiment provides a hydropneumatic accumulator generally designated 125 in which a pressure vessel is formed by an upper cup-shaped cylindrical cap 126 secured to a mating circular base block 127. Internal diameter D-5 in FIG. 10 is identified to show its relation to the further identified axial distance L. Block 127 is provided with an inlet pipe connection 128 and outlet pipe connection 129 adapted to make respective upstream and downstream connections. Outlet connection 129 in turn communicates with a pipe member 130 terminating in a trumpet-shaped, flared end 131 surrounding the outlet port 132. Outlet pipe 130 in turn resides within an annular cavity 135 hollowed out of base block 127 and surrounding pipe 130 in a concentric relation to provide the annular inlet port 136. Cap 126 and block 127 are secured together by bolts 140 and effectively clamp in place the peripheral edge portion of a flexible diaphragm 141 having an annular bead 142 fitted in sealing relation in a groove 143 formed in an inner peripheral base portion of cap 126. Diaphragm 141 when inoperative is partially folded and supported as illustrated in the solid line position of FIG. 10. Diaphragm 141 thus establishes a chamber 150 for holding a compressible fluid, e.g., a gas, and separating such compressible fluid from the substantially incompressible fluid being operated on by the hydropneumatic accumulator 125 illustrated in FIG. 10. As further illustrated in FIG. 10 it will also be seen that the substantially incompressible fluid being operated on is held below diaphragm 141 in the void surrounding inlet port 136 and outlet port 132. Also, since in FIG. 10 the illustrated dimension M-1 is seen in reference to the illustrated dimension M-2, it can be seen how diaphragm 141 when operative assumes the dotted line position of FIG. 10. As with the first embodiment, the pressure within chamber 150 is normally held at about 70% of line pressure.

Diaphragm 141 supports an anti-extrusion plate assembly 160 that is similar in operation and construction to the anti-extrusion plate assembly 90 previously explained in connection with FIG. 3. Plate assembly 160 of FIG. 10 includes a nut 161 having a threaded recess 162 for receiving a bolt 163 which passes through a hole 164 formed in the center of diaphragm 141. Bolt 163 in turn acts to clamp the central portion 141' of diaphragm 141 between an upper conical-shaped plate 165 in which nut 161 seats and a lower conical-shaped plate 166. Fluid sealing is effected by an annular rib 170 formed on the upper central surface portion 141' of diaphragm 141 with rib 170 being adapted to fit into a corresponding groove 171 formed on the bottom face of nut 161.

Auxiliary tensioned support for diaphragm 141 is provided by a plurality of elastic straps 175 supported by an upper conical-shaped plate 174 threaded onto the base portion of valve 176. Valve 176 is designed so as to act as a one-way valve for admission of a fluid into chamber 150 and, like a tire valve, is adapted to be released to reduce such pressure to the exact amount desired in a particular application. Straps 175 are molded by an elastomeric material, e.g., natural or synthetic rubber, and have T-shaped tangs 180 which are fitted into suitable holes 181, 182 drilled in plate members 165, 174. After insertion in the respective holes 181, 182 the respective tangs 180 will naturally flex outwardly and will retain the respective ends of the straps 175 in position as illustrated in the drawings. The presence of straps 175 enables the diaphragm 141 to be secured to the base block 127 near the outlet port 132 and with the anti-extrusion plate assembly 160 acting to insure that no portion of diaphragm 141 can be extruded into the outlet port 132.

Both embodiments provide extreme pressure sensitivity of a gas backed membrane, i.e., bag 35 or diaphragm 141. Both embodiments also insure that the flow is through the accumulator rather then remote from the accumulator thereby enabling the extreme pressure sensitive membrane of the invention, i.e., bag 35 or diaphragm 141, to act upon the flow. Another feature common to both embodiments is that the accumulator does not intercept and shut off the flow when in a non-operational mode meaning when the bag, i.e., bag 35, or diaphragm, i.e., diaphragm 141, are drawn to the maximum extent towards the outlet port of the accumulator. It will also be seen that both embodiments allow the accumulator of the invention, in either form, to be manufactured from readily available materials to enable compatibility with a wide range of liquid characteristics. Furthermore, both embodiments allow the membrane, i.e., bag 35 or diaphragm 141, to be molded from conventional elastomers without requiring any gluing or bonding operation for the production of the membrane or for its attachment to the containment vessel. In addition to the foregoing characteristics shared in common, it will also be seen that the second embodiment described in FIGS. 10-11 also provides a construction which enables the diaphragm to be secured near the outlet and thereby reduce the amount of internal vessel surface exposed to the liquid flowing through the accumulator. This arrangement provides both an exceptionally high degree of membrane sensitivity since the liquid only effectively sees membrane surface when it enters the accumulator. A further advantage is achieved in that the construction cost can be reduced when the accumulator is applied to handling corrosive and like special fluids. Other advantages attach to the FIGS. 12-16 constructions.

Figure 4:
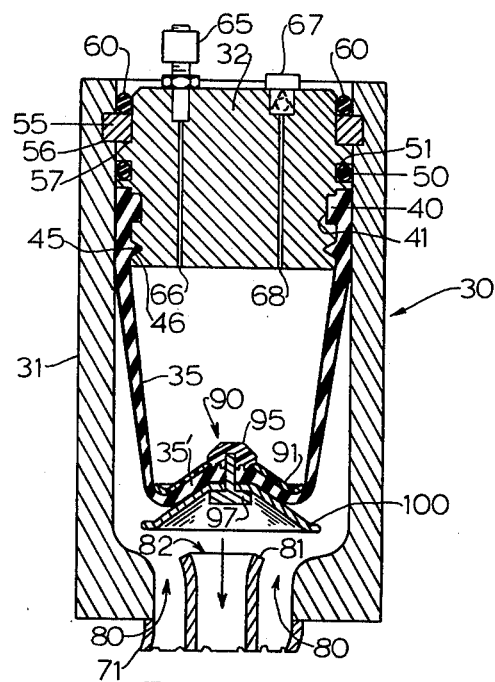
FIG. 4 is a partial sectional view of FIG. 3 showing the bag in a more distended position.
Figure 5:
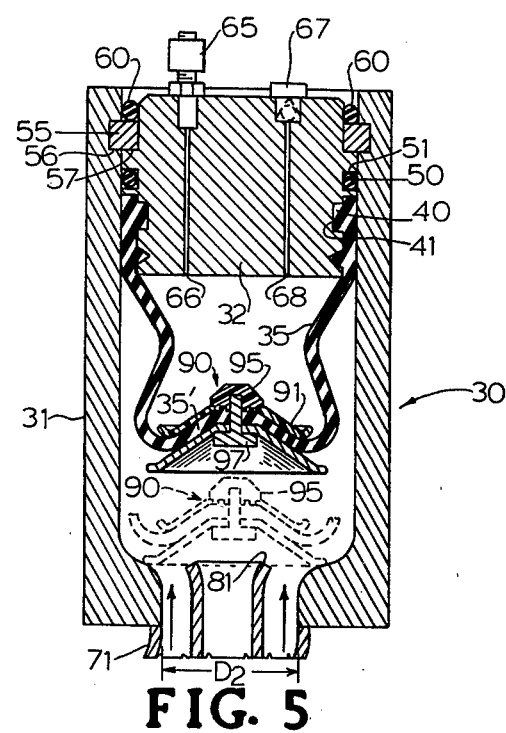
FIG. 5 is a partial sectional view of FIG. 3 showing the bag in a more compressed position and in dotted lines the position of the anti-extrusion valve of the invention in its lowest extreme position.
Figure 6:
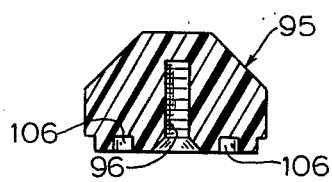
FIG. 6 is a somewhat enlarged cross-sectional view of a nut member employed in the anti-extrusion valve assembly of FIG. 3.
Figure 7:
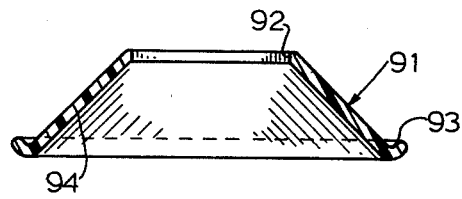
FIG. 7 is an enlarged cross-sectional view of the upper plate member employed in the anti-extrusion valve assembly of FIG. 3.
Figure 8:
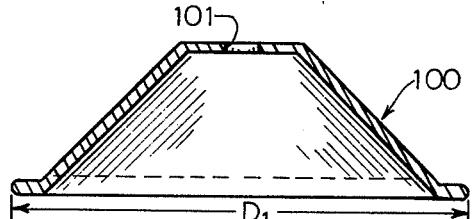
FIG. 8 is an enlarged cross-sectional view of the lower plate member employed in the anti-extrusion valve assembly of FIG. 3.

A most important characteristic associated with both embodiments is that the illustrated concentric inlet-outlet port arrangement in conjunction with the illustrated anti-extrusion assembly arrangement enables both ports to be covered by the valve plate, i.e., valve plate 100 in FIG. 5 or valve plate 166 in FIG. 10 but without interfering with free flow of the liquid between the two ports. Thus, in the inoperative dotted line position of the anti-extrusion valve assemby seen in FIG. 5, it will be noted that the outer diameter D-1 of the valve plate 100 exceeds and thus provides an area greater than the area provided by the outer diameter D-2 of the inlet port 80. Also, in FIG. 10, it will be noted that the outer diameter D-3 of the valve plate 166 is greater than the outer diameter D-4 of the inlet port 136. When the ambient line pressure is greater than the gaseous pressure set on the gaseous side of the membrane, i.e., within bag 35 or above diaphragm 141 in chamber 150 (FIG. 10) the membrane is enabled to contract as a result of flow coming into the accumulator as seen in the solid line positions shown in FIGS. 5 and 11 and in the dotted line position seen in FIG. 10. Also, the membrane, i.e., bag 35 or diaphragm 141, can readily expand at intervals to provide the intermittent discharge instantaneously required by the suction stroke of an adjacent pump as illustrated by the distended position of bag 35 in FIG. 4 and the maximum expanded position of diaphragm 141 in FIG. 10.

In operation, the first suction stroke of the pump will cause the membrane, i.e., bag 35 or membrane 141, to expand thus providing the suction volume required by the pump. The expansion of the gas on the gas side of the membrane results in a slight decrease in pressure within the gas chamber, i.e., within bag 35 or chamber 150 above diaphragm 141. As a result, replacement liquid will start to flow from the suction source. Upon the next suction stroke of the pump, a similar set of circumstances will apply. However, no substantial force will have been applied to prevent the continuous flow from the suction source into the invention accumulator. Consequently, over a period of time, the flow rate from the suction source into the accumulator of the invention will become relatively constant at the mean level of requirement and the accumulator will emit intermittent short bursts of liquid at the velocity required by the suction stroke of the pump.

In practice, this will mean that the suction strokes of the pump will result in complete filling of the pumping chamber which now no longer has to accelerate the whole body of the liquid in order to obtain its supply. Therefore, since the pump is completely filled when the discharge stroke takes place, the primary part of that stroke will not merely be dissipated by causing the liquid vapor to return from vapor to liquid. Hence, there will not be a point in the discharge stroke when the pump plunger, piston or diaphragam comes against a solid wall of liquid and, hence, suddenly emits a pulse with a shock wave imposed thereon. Thus, when the accumulator of the invention is applied to the suction side of a positive displacement pump, the pulsation emitted from the pump will be at a relatively low level and which may be easily attenuated by another accumulator of the type provided by the invention but, in this case, could be of a much smaller size than would otherwise be the case.

Another advantage and benefit of the accumulator of the invention arises when the invention accumulator is used in liquid process systems where the liquid is being transmitted from a pump which has multiple displacers, plungers, pistons, diaphragms, vanes, lobes, or the like. These multiple elements necessarily cause a higher frequency of pulsation and noise than could readily enter and leave and, thus, be attenuated by a single ported pulse attenuating bottle attached to the liquid duct by a "T" connection. The accumulator of the invention, with its inlet-outlet flow-through arrangement, thus provides a significant advance in the art in dealing with high frequency pulsations of this type.

The accumulator of the invention is also capable of intercepting a shock traveling down a pipe which would otherwise bypass a single ported attentuating device. In this regard, it will be noted that use of a trumpet-shaped, flared inner concentric duct, i.e., outlet port 81 in FIG. 3 and outlet port 132 in FIG. 10, causes any pulse or shock entering the accumulator through the inlet port, i.e., through pipe 71 in FIG. 3 or through inlet 128 in FIG. 10, to be directed outwardly towards the space between the anti-extrusion valve plate, i.e., valve plate 100 in FIG. 3 or valve plate 166 in FIG. 10, and the vessel wall and will therefore come immediately into contact with the membrane itself, i.e., bag 35 or diaphragm 141, and hence be absorbed or attenuated.

The concentric inlet-outlet port arrangement illustrated in the drawings for both embodiments also provides a further benefit by effecting a type of mixing action. In this regard, it may be noted that part of the flow of liquid coming into the accumulator of the invention will go freely into the interior of the vessel whereas other portions of the liquid are necessarily forced to flow around the outside of the concentric outlet pipe, i.e., pipe 73 in FIG. 3 or pipe 130 in FIG. 10, before entering the interior of the vessel and therefore there is a time lapse effect imposed on the various constituent parts of the incoming flow. The trumpet-shaped flared opening provided on the outlet port, i.e., port 82 in FIG. 3 or port 132 in FIG. 10, effectively provides a funnel of naturally decreasing cross-sectional area which imparts to the exiting flow a vortex motion. With the vessel interior there will have occurred a dramatic velocity change for all portions of the fluid. It will, therefore, be appreciated that if the flow entering the accumulator of the invention has as its constituent parts a number of different substances to be mixed that the combination of the varying flow path distances, the time lapse effect caused by flowing around the outside of the internal funnel, the velocity drop within the interior of the vessel, the sharp-edged annual orifice effect of the funnel lip and the vortex motion imparted all result in imparting to the liquid a thorough mixing. Thus, the hydropneumatic accumulator of the invention serves not only its normal purposes but also provides a mixing function which can be carried out while performing those other functions for which the invention accumulator is primarily intended to perform.

It will be noted that in both embodiments the anti-extrusion plate assembly incorporates a bolt, i.e., bolt 97 (FIG. 9) or bolt 163 (FIG. 10) which passes through a hole in the center of the membrane, i.e., bag 35 or diaphragm 141. The molding of the membrane with a hole in its center through which the anti-extrusion valve plate bolt passes is important as it enables the core of the mold tool to be stabilized at its substantially unsupported end by a location pin within the mold tool cavity. This stabilizing effect enables extremely high, typically 20,000 psi to 40,000 psi elastomer injection pressures to be used without the substantially unsupported end of the mold tool core moving and causing variations to the thickness of the membrane. These pressures are typically necessary when attempting to mold the membranes in exotic chemical resistant perfluoroelastomers. Thus, the accumulator of the invention is of special advantage in the process industries in which it is desirable to have membranes which are moldable in all known elastomers to meet the widely varying compatibility requirements.

Figure 3:
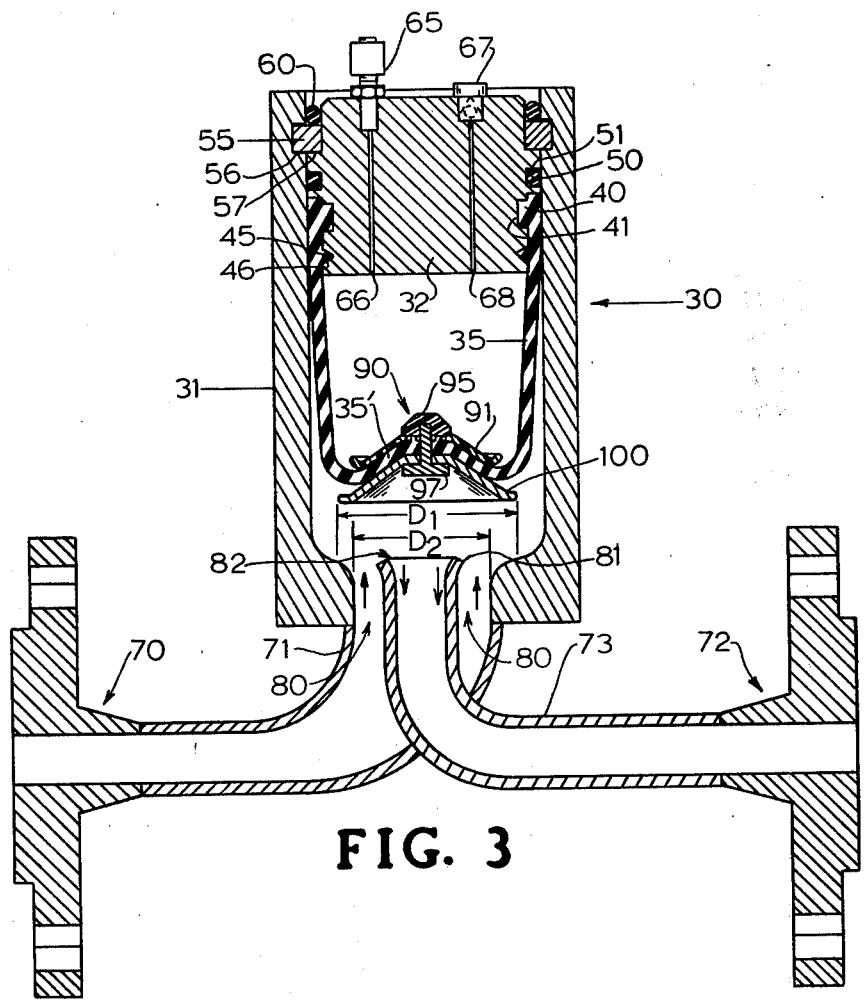
FIG. 3 is a cross-sectional view of a first embodiment utilizing a bag-type membrane.

The sensitivity of the hydropneumatic pulse interceptor accumulator of the invention is seen in reference particularly to FIGS. 3–5. In FIG. 3, bag 35 is positioned as it might be in equilibrium as a suction damper at the moment when flow from the left has just been overtaken by the beginning of the pump suction stroke velocity with flow going to the right. FIG. 4 shows bag 35 in a more distended position as when in use as a suction velocity stabilizer with a tank connected to the left and a pump intake to the right supplying a fast slurp on the suction stroke. In FIG. 5, bag 35 is shown in a more compressed position in solid lines as when applied as a suction damper and as bag 35 would be positioned at the end of the cycle enabling continuous flow from a tank connected to the left but before the suction of the pump connected to the right has begun. Diaphragm 141, like bag 35, also serves as a flexible membrane and thus in the same manner provides a high degree of response and sensitivity in the diaphragm embodiment represented by FIGS. 10–11 as well as in other forms of the diaphragm embodiments shown in FIGS. 12–16 and next described.

As is well known to those skilled in the art, a hydropneumatic pulse interceptor and hydropneumatic accumulator apparatus, in general, is required to be adaptable to a variety of pressure and fluid conditions. Also, various fluids required to be handled have corrosive or other properties which require that the choice of material in contact with the fluid be compatible with the nature of the fluid. FIGS. 12–16 illustrate a range of other constructions adapted to the diaphragm embodiment of the invention and thus illustrate the versatility of the invention to a relatively wide range of applications.

Figure 12:
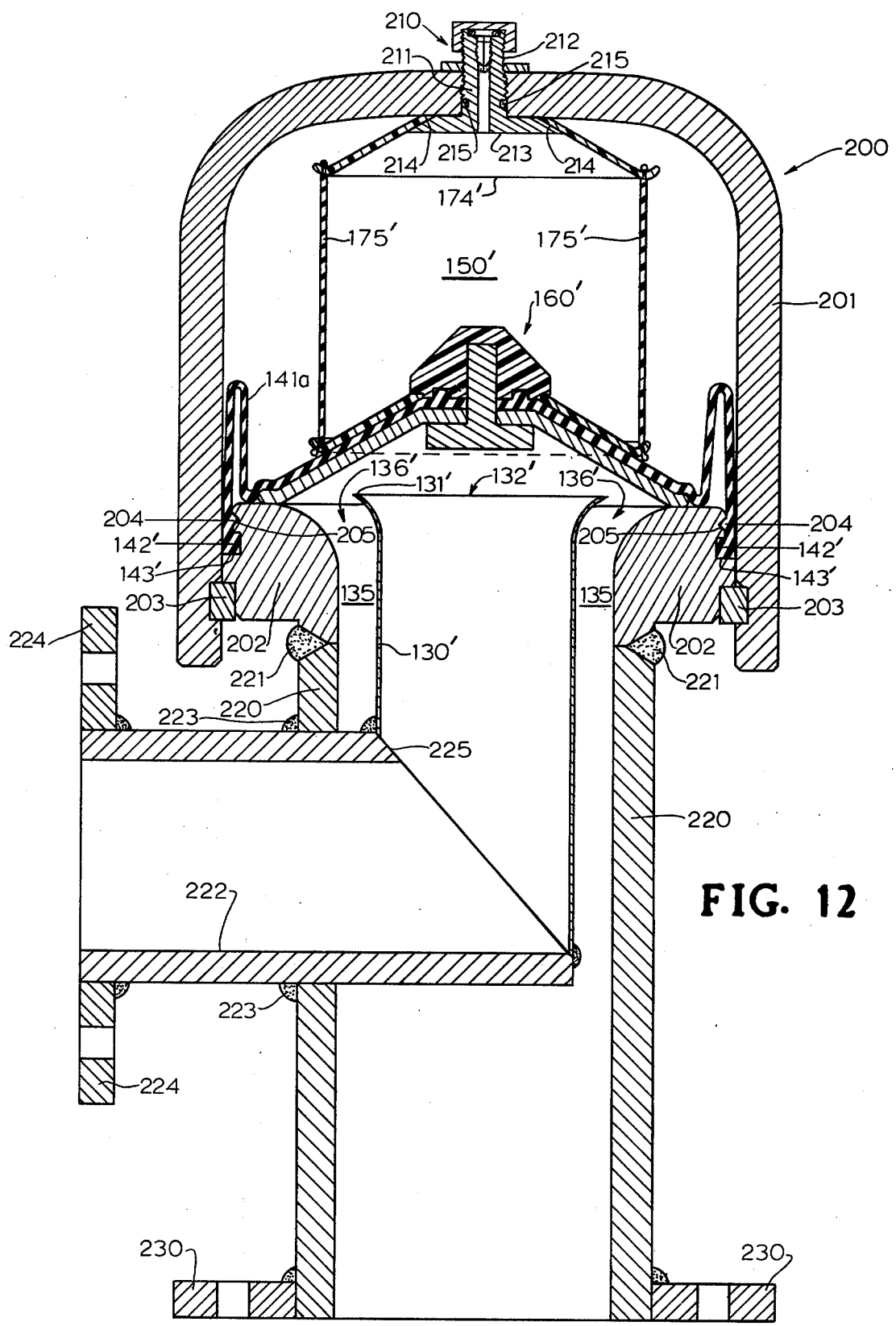
FIG. 12 illustrates a hydropneumatic accumulator utilizing a diaphragm-type membrane with auxiliary elastic support straps as in FIG. 10 but with an alternative one-way valve and thick wall pressure vessel construction.

Making reference to FIG. 12, accumulator 200 has a one-piece, relatively thick cap 201 and a relatively thick base block 202 which are secured together in a locking relation by lock ring 203. ASME standards relate thickness to diameter. An 8" diameter may be assumed for reference. Thus, a relatively thick wall compressible fluid containing pressure vessel is formed as compared to the relatively thin wall compressible fluid containing vessel shown in FIG. 10. A "thick" wall as referred to here might be, for example, 0.625 inches thick whereas a "thin" wall might be, for example, 0.150 inches thick.

Diaphragm 141a, is substantially identical to diaphragm 141 of FIG. 10 as previously referred to. However, it will be noted that diaphragm 141a, employs an annular bead 142' fitting into groove 143' in base block 202 and an anchorage rib 204 fitted into an anchorage groove 205 in base block 202. The anti-extrusion plate assembly 160' is identical to the anti-extrusion plate assembly 160 of FIG. 10 and operates as previously described. Plate assembly 160' is suspended from upper conical-shaped plate 174' by elastic straps 175'. In the form of the invention previously described in reference to FIG. 10, four of such straps 175 were assumed to be employed whereas in the construction being described in reference to FIG. 12, only two such straps 175' are assumed to be employed. The one-way valve structure 210 of FIG. 12 replaces valve 176 of the FIG. 10 construction and is deemed best suited to relatively high gas pressures. Valve 210 has a body portion 211 which has an external threaded portion 212 which is threadably received by cap 201 of accumulator 200. Head portion 213 of valve 210 is of sufficient diameter to maintain upper conical-shaped plate 174' thereon. The upper angled sides 214 mate with the interior angled sides of plate 174'. An O-ring 215 is employed to eliminate any leakage between cap 201 and body portion 211. The valve mechanism is designed to act as a one-way valve for admission of a fluid into chamber 150' and, like a tire valve, is adapted to be released to reduce such pressure to the exact amount desired in a particular application.

Base block 202 is provided with a tubular extension 220 which is welded to block 202 by weld seam 221. Extension 220 has a flange 230 welded thereto at its outermost end for receiving an appropriate pipe connection. An inlet pipe 222 passes through an appropriate opening in extension 220 and is welded along seam 223. A flange plate 224 is welded to the outside end portion of pipe 222 for making another pipe connection. The inside end portion 225 of pipe 222 is angled and receives in mating relation the angled end of trumpet-shaped pipe member 130'. The flared end 131' of outlet pipe 130' resides within annular cavity 135' hollowed out of base member 202 and surrounding pipe 130' in a concentric relation to provide the annular inlet port 136'. As previously stated, cap 201 and base block 202 are secured together by lock ring 203 and effectively lock or clamp in place annular bead 142' and anchorage rib 204 of diaphragm 141a.

Diaphragm 141a thus establishes a chamber 150' for holding a compressible fluid, e.g. a gas, and separating such compressible fluid from the substantially incompressible fluid being operated on by the hydropneumatic apparatus 200 illustrated in FIG. 12. As further illustrated in FIG. 12, it will be seen that the substantially incompressible fluid being operated on is held below diaphragm 141a in the void surrounding inlet port 136' and outlet port 132'. As with the constructions previously described, the pressure within chamber 150' is normally held at about seventy percent of line pressure.

Figure 13:
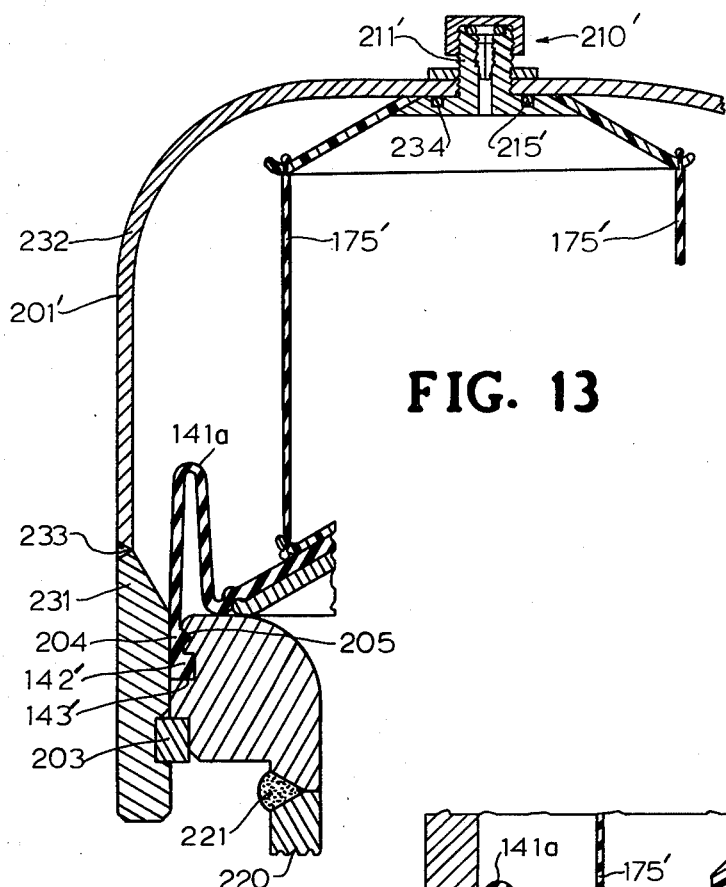
FIG. 13 is a fragmentary section view of a portion of the FIG. 12 accumulator but illustrating a thin wall cap in which the alternative valve structure is mounted.

FIG. 12 thus illustrates use of a relatively thick or heavy-walled cap whereas FIG. 13 illustrates use of a relatively thin-walled cap for confining gas at a lesser pressure. In FIG. 13, cap 201' is composed of a lower thick-walled section 231 welded by weld 233 to an upper thin-walled section 232. In order to fit into thin-walled section 232, valve 210 of FIG. 12 is modified slightly for the construction of FIG. 13. Valve 210' for use with a thin-walled cap has a shortened length body portion 211'. As a further modification as compared to FIG. 12, O-ring 215' is seated in a groove 234 in head portion 213' of valve 210'. O-ring 215' prevents any leakage between cap portion 232 and head portion 213'. All other members, i.e. diaphragm 141a, plate 174', straps 175' and plate assembly 160' are identical in structure and operation to those of the construction illustrated in FIG. 12. Thus, dependent on the application, either a thin wall or thick wall type gas pressure vessel may be provided for purposes of the invention.

Figure 14:
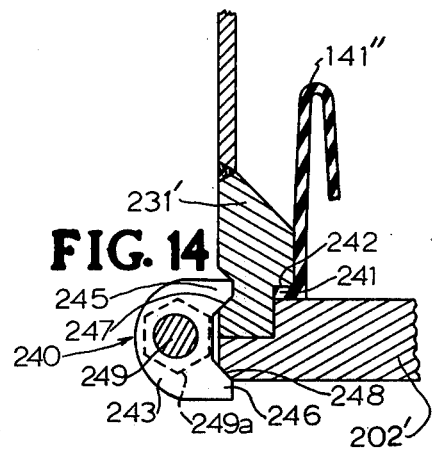
FIG. 14 is a fragmentary section view of a modified pressure vessel which is held clamped by a victaulic-type clamp device.
Figure 15:
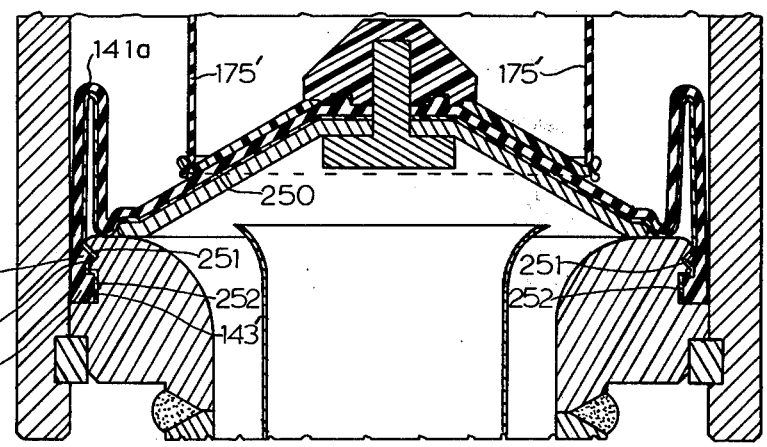
FIG. 15 is a fragmentary section view of the pressure vessel and plate assembly structure of FIG. 12 illustrating employment of a protective thin, liquid and gas impervious layer on sheet, e.g. Teflon, adjacent the liquid side of the membrane enabling the membrane to be exposed to a wide range of chemicals that might otherwise attack the conventional diaphragm elastomer material.

FIG. 14 offers a further variation from the FIG. 12-13 arrangements. Lower portion 231 of the FIG. 13 embodiment is modified so that diaphragm 141" is held in place by a portion 231' against modified base block 202'. Such an arrangement has a distinct advantage in the food industry where minimizing and preferably elimination of all grooves or other areas where food might collect is a prime necessity. For this purpose, victaulic type clamps 240 are employed in the FIG. 14 construction as the means for locking base block 202' and lower portion 231' together. Diaphragm 141" has an annular lip 241 which fits into groove 242 in lower portion 231'. Diaphragm 141" provides a tight fit between diaphragm 141" and base portion 202' and essentially eliminates any area that might otherwise collect food. The conventional victaulic clamp 240 is composed of a pair of circular bands 243, 244 (not shown) which have wedge members 245, 246 which fit mating sloped edges 247, 248 and are held together by bolts 249 and nuts 249a in the conventional and well-known manner.

As previously mentioned, the handling of some fluids are particularly difficult because of their corrosive or other chemical characteristics. The FIG. 15 construction provides a slightly modified construction which is identical to accumulator 200 of FIG. 12 except for the addition of a thin, protective, flexible sheet 250 secured between the lower conical-shaped plate and diaphragm 141a so as to protect diaphragm 141a from liquid contact. Sheet 250 should preferably be made of a sheet material which exhibits essentially no tendency to react with any fluid expected to flow through the apparatus of the invention. Flexible Teflon sheet has been found especially suited for this purpose. Sheet 250 resides against and protects diaphragm 141a on its inside surface adjacent the lower, conical-shaped plate. Sheet 250 has an anchorage rib 251 which mates with anchorage rib 204 of diaphragm 141a and resides in anchorage groove 205 in base block 202. Also, sheet 250 has an annular bead 252 which mates with annular bead 142' and fits into groove 143' in base block 202. Teflon sheet 250 is extremely useful in instances where the material being moved through the invention apparatus should preferably be kept out of contact with any portion of diaphragm 141a. Clinical liquids provide an example of such an application Thus, by providing a relatively inexpensive sheet 250 of a material which is compatible with the liquid being handled and of sufficient size so as to allow diaphragm 141a to perform its normal function, these types of application are readily dealt with by the invention.

Figure 16:
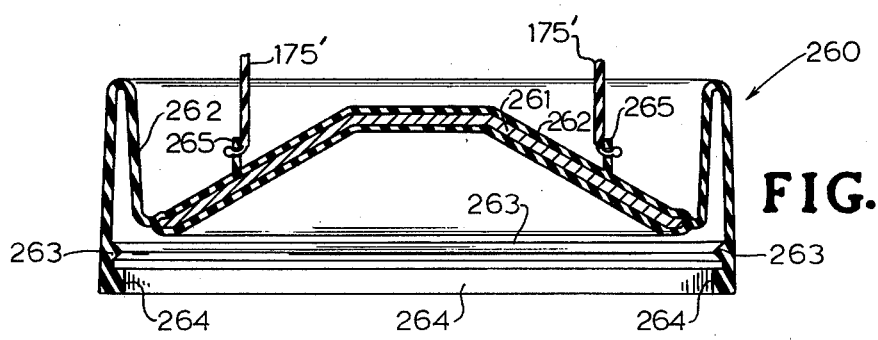
FIG. 16 is a section view through an alternative combined diaphragm and valve plate in which the valve plate is encased by the diaphragm.

FIG. 16 provides a combined diaphragm and lower conical-shaped plate. Diaphragm-plate member 260 is also useful with clinical or like liquids which might otherwise react with the material employed to make the conical-shaped plate member. Plate member 261 employs a molded elastomer material 262 arranged so as to completely surround plate member 261. Diaphragm-plate member 260 has an anchorage rib 263 and an annular head 264 molded therewith of the elastomer material. The construction of FIG. 16 is deemed to be particularly useful where it is desired to reduce the amount of relatively expensive metal material in contact with the liquid being operated on thus producing a substantially less expensive apparatus for such applications. Straps 175' may be secured by appropriately shaped and molded tabs 265.

What is claimed is:
1. A liquid flow smoother comprising in combination:
   (a) a hollow cylindrical vessel having one end substantially closed and the opposite end closed by a removable circular base member extending across and closing said opposite end;
   (b) gas valve means associated with said substantially closed end of said vessel and having a channel formed in said gas valve means to permit entry of a gaseous fluid within said vessel;

(c) a flexible membrane member suspended within said vessel immediately adjacent said base member and having an outer peripheral edge portion held in clamped sealing relation between said vessel and base member and establishing within said vessel and on one side of said membrane member a first fluid-type chamber communicating with said channel and valve means and holding a compressible fluid admitted through said channel and valve means and held at a predetermined pressure within said chamber, said membrane member having an outer peripheral portion within said clamped peripheral edge portion which assumes a folded position when said membrane member is inoperative and flexes from such folded position when said membrane member is operative;

(d) an annular tubular inlet portion surrounding and concentric with an outlet port formed by a tube having a flared trumpet-like entrance within said vessel, said ports being formed and centrally located in said removable base member enabling a substantially incompressible fluid to flow into said vessel through the inlet portion, while within said vessel enabling said incompressible fluid to turn towards selected portions of said membrane on the side thereof opposite the said one side of said membrane establishing said chamber and thereafter without any flow restrictions between said ports exit through said outlet port, said membrane being adapted when operative to move in a first direction in a limited amount towards said gaseous fluid chamber and when inoperative being adapted to move in an opposite second direction toward said inlet and outlet ports to an inoperative position in correspondence with the changing character of said fluid flow; and (e) an anti-extrusion valve plate centrally located on said membrane member on the said opposite side thereof and adapted when said membrane member is moved to its inoperative position toward said inlet and outlet ports to be supported on said base member within said vessel and provide a cover over both said ports to prevent extrusion of said membrane member therethrough and to simultaneously establish an unrestricted flow path between said ports and partially bounded by said valve plate whereby the fluid entering said vessel through said inlet port is under all positions of said membrane member provided with an unrestricted flow path to flow out of said vessel through said outlet port, said valve plate being shaped so as to direct incoming liquid flow impinging thereon when said membrane is in said inoperative position and said plate is over said ports, said valve plate being further adapted to move towards and rest against said valve means and thereby limit the movement of said membrane in said first direction when said membrane is operative.

2. A liquid flow smoother as claimed in claim 1 wherein said valve plate comprises a conical-shaped plate, the major diameter of which exceeds the outside diameter of said annular inlet port thereby enabling said plate to both cover and maintain flow between said ports.

3. A liquid flow smoother as claimed in claim 1 including a plurality of elastic strap members suspended internally of said vessel and attached to the said one side of said membrane member and being adapted to provide support for said membrane member and said valve plate and to being stretched when said membrane member is positioned proximate said inlet and outlet ports and to being relaxed when said membrane member moves in an opposite direction.

4. A liquid flow smoother as claimed in claim 2 wherein said membrane member is formed such that said valve plate is incorporated and enclosed within a central portion of said membrane member.

* * * * *